United States Patent
Salter et al.

(10) Patent No.: US 12,480,774 B2
(45) Date of Patent: Nov. 25, 2025

(54) SYSTEMS AND METHODS FOR JUMP STARTING VEHICLES

(71) Applicant: Ford Global Technologies, LLC, Dearborn, MI (US)

(72) Inventors: Stuart C. Salter, White Lake, MI (US); Matthew Volpone, Canton, MI (US); Daniel Luke Rabideau, Ann Arbor, MI (US); Todd Ansbacher, Westland, MI (US); David Celinske, Wolverine Lake, MI (US)

( * ) Notice: Subject to any disclaimer, the term of this patent is extended or adjusted under 35 U.S.C. 154(b) by 219 days.

(21) Appl. No.: 18/500,015

(22) Filed: Nov. 1, 2023

(65) Prior Publication Data
US 2025/0137797 A1 May 1, 2025

(51) Int. Cl.
G01C 21/36 (2006.01)
H02J 7/00 (2006.01)

(52) U.S. Cl.
CPC ............... *G01C 21/36* (2013.01); *H02J 7/00* (2013.01)

(58) Field of Classification Search
CPC .. G01C 21/36; H02J 7/00; H02J 7/342; Y02T 10/70
See application file for complete search history.

(56) References Cited

U.S. PATENT DOCUMENTS

| | | |
|---|---|---|
| 9,194,357 B2 | 11/2015 | Huang |
| 10,363,824 B1 * | 7/2019 | Lumpkin ................. H02J 7/342 |
| 11,072,256 B2 | 7/2021 | Butler et al. |
| 11,374,429 B2 | 6/2022 | Wood |
| 2013/0127611 A1 | 5/2013 | Bernstein et al. |
| 2015/0015183 A1 * | 1/2015 | Pursifull ................. H02J 7/342 320/105 |
| 2017/0240059 A1 * | 8/2017 | Weicker .............. H02J 7/00302 |
| 2022/0094192 A1 * | 3/2022 | Wood ...................... H02J 7/342 |
| 2023/0057431 A1 | 2/2023 | Nook et al. |
| 2023/0318321 A1 * | 10/2023 | Liu ....................... H02J 7/0047 320/105 |

OTHER PUBLICATIONS

Paul Nicastri & Henry Huang; Jump Starting 42V Power Net Vehicles; Aug. 200, IEEE AES Systems Magazine, pp. 25-30 (Year: 2000).*
IEEE Article (Year: 2000).*
Michael Cox, et al., Vehicle-Integrated Battery and Power System Management Based on Conductance Technology to Enable Intelligent Generating Systems (Ingen®), Society of Automotive Engineers, Inc.,Nov. 12-14, 2001, pp. 1-8.

* cited by examiner

*Primary Examiner* — Michael C Zarroli
(74) *Attorney, Agent, or Firm* — Frank Lollo; Eversheds Sutherland (US) LLP

(57) ABSTRACT

A first vehicle configured to jump start a second vehicle is disclosed. The first vehicle may include a first energy storage system, a second energy storage system, and a converter. The first vehicle may further include a switch between the second energy storage system and the converter, and a control unit. The control unit may obtain a user request to activate a jump start mode of the first vehicle, deactivate a vehicle load in the first vehicle, and cause the switch to operate in the ON state. The control unit may further cause the second energy storage system to supply a first amount of current to pre-charge a battery of the second vehicle for a predefined time duration, and cause the second energy storage system to supply a second amount of current to the battery to start a second vehicle ignition system when the battery is pre-charged.

20 Claims, 4 Drawing Sheets

US 12,480,774 B2

SYSTEMS AND METHODS FOR JUMP STARTING VEHICLES

TECHNICAL FIELD

The present disclosure relates to battery electric vehicles (BEVs) and more specifically to systems and methods for jump starting vehicles using BEVs.

BACKGROUND

A jump start method is typically used to start a vehicle (such as an internal combustion engine vehicle or a hybrid vehicle) when vehicle's battery gets discharged. To jump start the vehicle, the discharged battery may be temporarily connected to another battery (e.g., of another vehicle) that provides energy to the discharged battery. When the discharged battery is connected to the other battery, an ignition of the other vehicle may be turned ON to deliver electric current to the discharged battery. In this manner, the battery of the other vehicle recharges the discharged battery and also assists in cranking the vehicle. When the vehicle gets started, vehicle alternator/generator may recharge the discharged battery, and the other battery may be disconnected.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
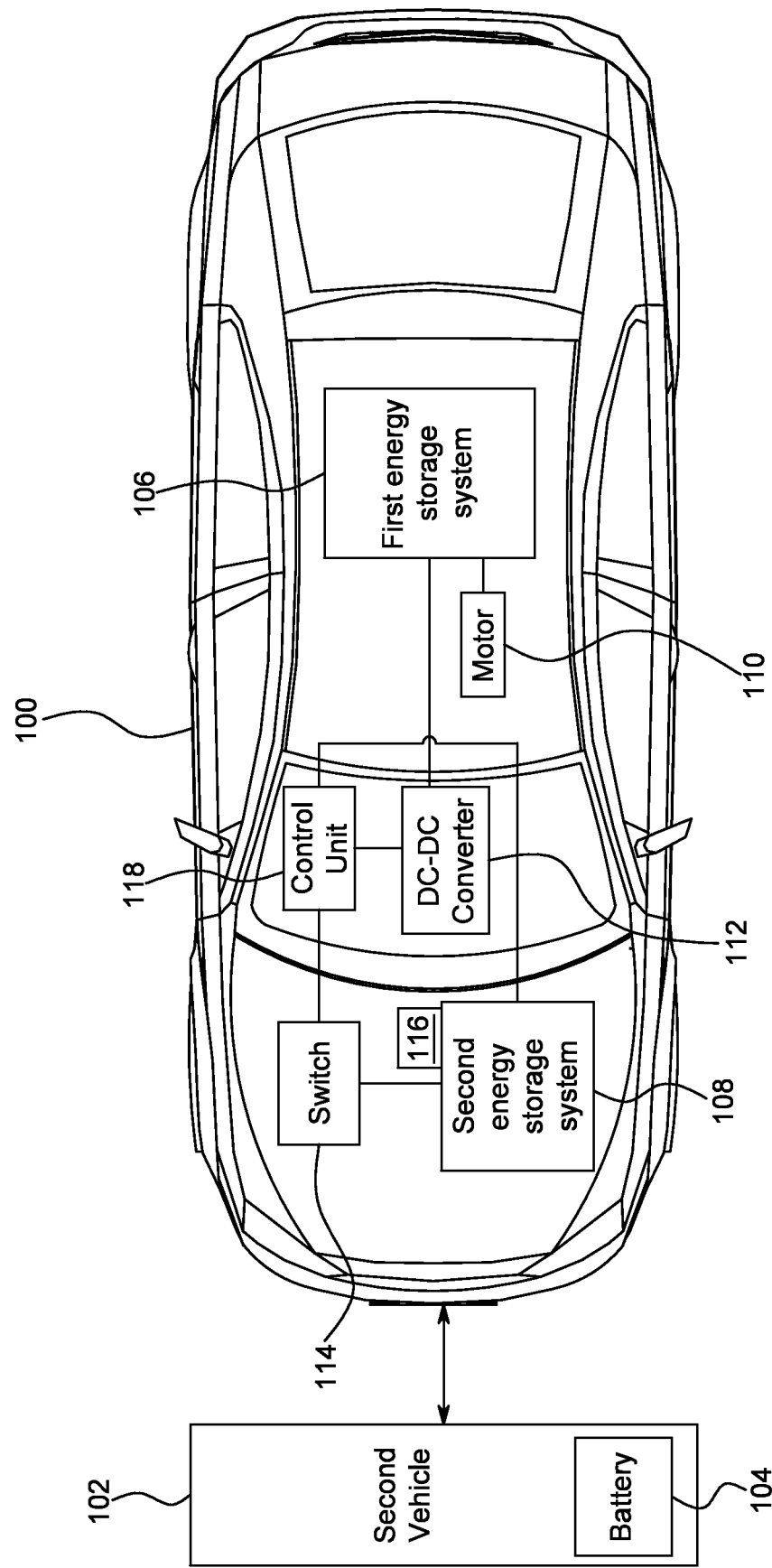
FIG. 1 depicts a block diagram of a first vehicle configured to jump start a second vehicle in accordance with the present disclosure.

The present disclosure describes a first vehicle configured to jump start a battery of a second vehicle. The first vehicle may be an Electric Vehicle (EV) and the second vehicle may be an Internal Combustion Engine (ICE) vehicle or a hybrid vehicle. The first vehicle may include a first energy storage system and a second energy storage system. The first energy storage system may be configured to provide power to a vehicle electric machine such as an electric motor that may drive vehicle wheels. The second energy storage system may be configured to provide power to one or more vehicle loads/accessories and provide power to the battery associated with the second vehicle when the second vehicle may be connected to the first vehicle (e.g., via a jumper cable).

The first vehicle may further include a DC-DC converter that may be configured to convert high-voltage power from the first energy storage system to a low-voltage power output that may be provided to the second energy storage system. The first vehicle may additionally include a switch configured to selectively connect the DC-DC converter with the second energy storage system and may operate in an ON state and an OFF state.

In some aspects, during operation, a vehicle operator may generate a user request to activate a jump start mode of the first vehicle. The vehicle operator may generate the user request via a user interface. The user interface may be associated with a user device (such as a mobile phone, a laptop, a wearable device, a tablet, and/or the like) or a Human-Machine Interface (HMI) associated with the first vehicle. When the vehicle operator generates the user request, the first vehicle may open a connection between the second energy storage system with the DC-DC converter (i.e., operate the switch in the OFF state). The first vehicle may then generate and transmit a notification to the user interface. The notification may include visual indications of connection points and instructions to connect the battery associated with the second vehicle with the first vehicle via the jumper cable. The first vehicle may further verify the connection of the jumper cable by using a detection unit (e.g., a battery management sensor) that may measure flow of current and voltage at the second energy storage system. The first vehicle may further provide feedback to the vehicle operator, responsive to the verifying the connection.

In some aspects, the first vehicle may disable/deactivate one or more vehicle features/loads after receiving the user request to activate the jump start mode. Deactivating the vehicle features/loads enables the first vehicle to supply more power from the DC-DC converter to the second energy storage system, which may assist in efficiently cranking the engine associated with the second vehicle.

In further aspects, the first vehicle may pre-charge the battery associated with the second vehicle by supplying a first amount of current (e.g., 100 A-120 A) for a predefined time duration (e.g., 2 minutes) after operating the switch in the ON state. After pre-charging the battery for the predefined time duration, the first vehicle may operate the switch in the OFF state and measure voltage at the second energy storage system by using the detection unit. Responsive to measuring the voltage, the first vehicle may determine an additional time duration that may be required to pre-charge the battery. In some aspects, the first vehicle may determine the additional time duration based on the measured voltage and battery type/capacity of the battery associated with the second vehicle. In some aspects, the first vehicle may obtain information associated with the battery type and the battery capacity from the vehicle operator. Alternatively, the first vehicle may determine the battery type and the battery capacity by obtaining inputs from vehicle exterior cameras.

In further aspects, when the battery may be pre-charged (e.g., after the additional time duration), the first vehicle may increase a supply of current from the first amount of current (e.g., 100-120 A) to a second amount of current (200 A) to enable the first vehicle to efficiently crank the second vehicle engine. In this manner, the first vehicle may jump start the battery associated with the second vehicle.

The present disclosure discloses a method to facilitate an EV to jump start an ICE vehicle or a hybrid vehicle without creating any adverse condition for the EV. The method further facilitates the vehicle operator to conveniently connect the battery associated with the ICE vehicle or the hybrid vehicle with the EV by outputting visual indications/instructions on the user interface.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts a block diagram of an example first vehicle 100 configured to jump start a second vehicle 102 in accordance with the present disclosure. The first vehicle 100 may take the form of any passenger or commercial vehicle such as, for example, a car, an off-road vehicle, a work vehicle, a crossover vehicle, a van, a minivan, a taxi, a bus, a truck, etc. Further, the first vehicle 100 may be a manually driven vehicle and/or may be configured to operate in partially or fully autonomous mode. In an exemplary aspect, the first vehicle 100 may be a Battery Electric Vehicle (BEV), and the second vehicle 102 may be an internal combustion engine (ICE) vehicle or a hybrid vehicle. The second vehicle 102 may include a battery 104 that may be configured to start or crank engine of the second vehicle 102. In some aspects, the battery 104 may be temporarily connected to the first vehicle 100 to crank the second vehicle engine (e.g., when the battery 104 may be discharged).

The first vehicle 100 may include a plurality of components including, but not limited to, a first energy storage system 106, a second energy storage system 108, an electric motor 110, a Direct Current-Direct Current (DC-DC) converter 112, a switch 114, a detection unit 116, and/or a control unit 118.

Figure 4:
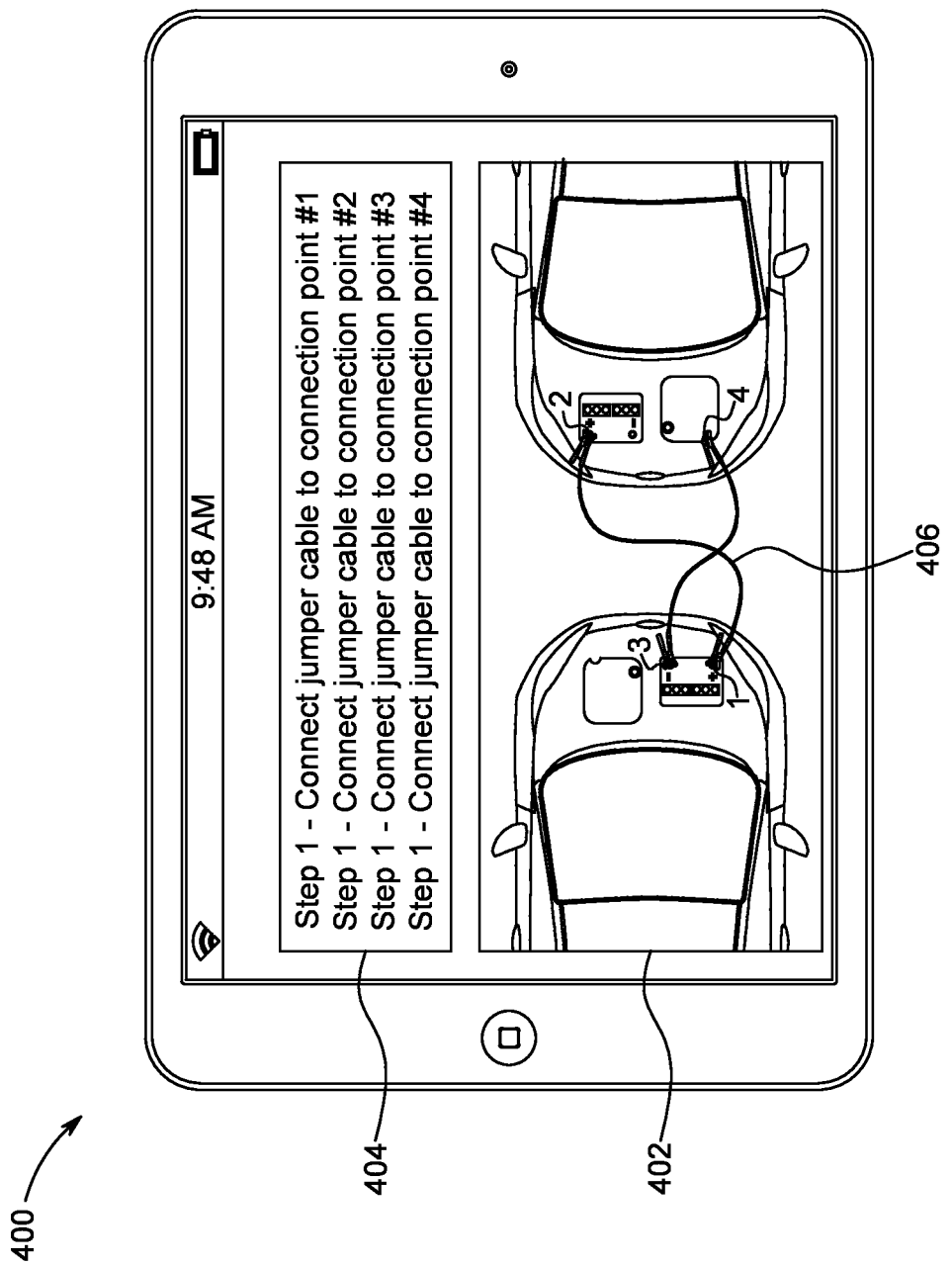
FIG. 4 depicts a snapshot of a user interface displaying one or more notifications to assist a vehicle operator to jump start a vehicle in accordance with the present disclosure.

In some aspects, the first energy storage system 106 may be a traction battery pack configured to provide power to the electric motor 110. The electric motor 110 may be configured to receive the power and drive vehicle wheels (not shown). The second energy storage system 108 may be an auxiliary battery that may be configured to power one or more vehicle loads/accessories. In some aspects, the second energy storage system may be 12 Volt 18 Ah battery. The loads/accessories may include, but are not limited to, headlights, window motors, pumps, etc. The first energy storage system 106 may have higher voltage power than the second energy storage system 108. In some aspects, the second energy storage system 108 may be configured to be temporarily connected to the battery 104 to jump start the second vehicle 102. In an exemplary aspect, the second energy storage system 108 may be connected to the battery 104 via a conventional jumper cable (shown as jumper cable 406 in FIG. 4).

The DC-DC converter 112 may be a step-down converter and may be configured to receive high-voltage power from the first energy storage system 106. Responsive to receiving the high-voltage power, the DC-DC converter 112 may reduce the high-voltage power to a low-voltage power and provide/supply the low-voltage power to the second energy storage system 108 (e.g., to charge the second energy storage system 108). In some aspects, the DC-DC converter 112 may be configured to supply the low-voltage power to the second energy storage system 108 via the switch 114.

The switch 114 may be configured to operate in an ON state and an OFF state. In the ON state, the switch 114 may enable flow of current from the DC-DC converter 112 to the second energy storage system 108. In the OFF state, the switch 114 may prevent/disable the flow of current from the DC-DC converter 112 to the second energy storage system 108. In this manner, the switch 114 may be configured to selectively connect the DC-DC converter 112 with the second energy storage system 108 and may open or close the circuit between the DC-DC converter 112 and the second energy storage system 108.

The detection unit 116 may be configured to measure the flow of current in and out of the second energy storage system 108 and a voltage at a second energy storage system post. In some aspects, the detection unit 116 may include a current/voltage sensor or the detection unit 116 may be a battery management sensor. The control unit 118 may be communicatively coupled to the detection unit 116 and may receive inputs from the detection unit 116.

The control unit 118 may be configured to control operation of the DC-DC converter 112 (e.g., output from the DC-DC converter 112) and the switch 114. Specifically, the control unit 118 may be configured to control second energy storage system charging by controlling operation of the DC-DC converter 112 and the switch 114. In some aspects, the control unit 118 may be configured to control the second energy storage system charging based on the inputs obtained from the detection unit 116. In an exemplary aspect, the control unit 118 may be configured to control the second energy storage system charging when the second vehicle 102 may be connected to the first vehicle 100 for jump start. The control unit 118 may include one or more controllers communicatively coupled with each other and configured to jump start of the second vehicle 102. The operation performed by the first vehicle 100 to jump start the second vehicle 102 is described below in conjunction with FIGS. 2 and 3.

The first vehicle 100 and a vehicle operator implement and/or performs operations, as described here in the present disclosure, in accordance with the owner manual and safety guidelines. In addition, any action taken by the vehicle operator based on recommendations or notifications provided by the first vehicle 100 should comply with all the rules specific to the location and operation of the first vehicle 100 (e.g., Federal, state, country, city, etc.). The recommendation or notifications, as provided by the first vehicle 100 should be treated as suggestions and only followed according to any rules specific to the location and operation of the first vehicle 100.

Figure 2:
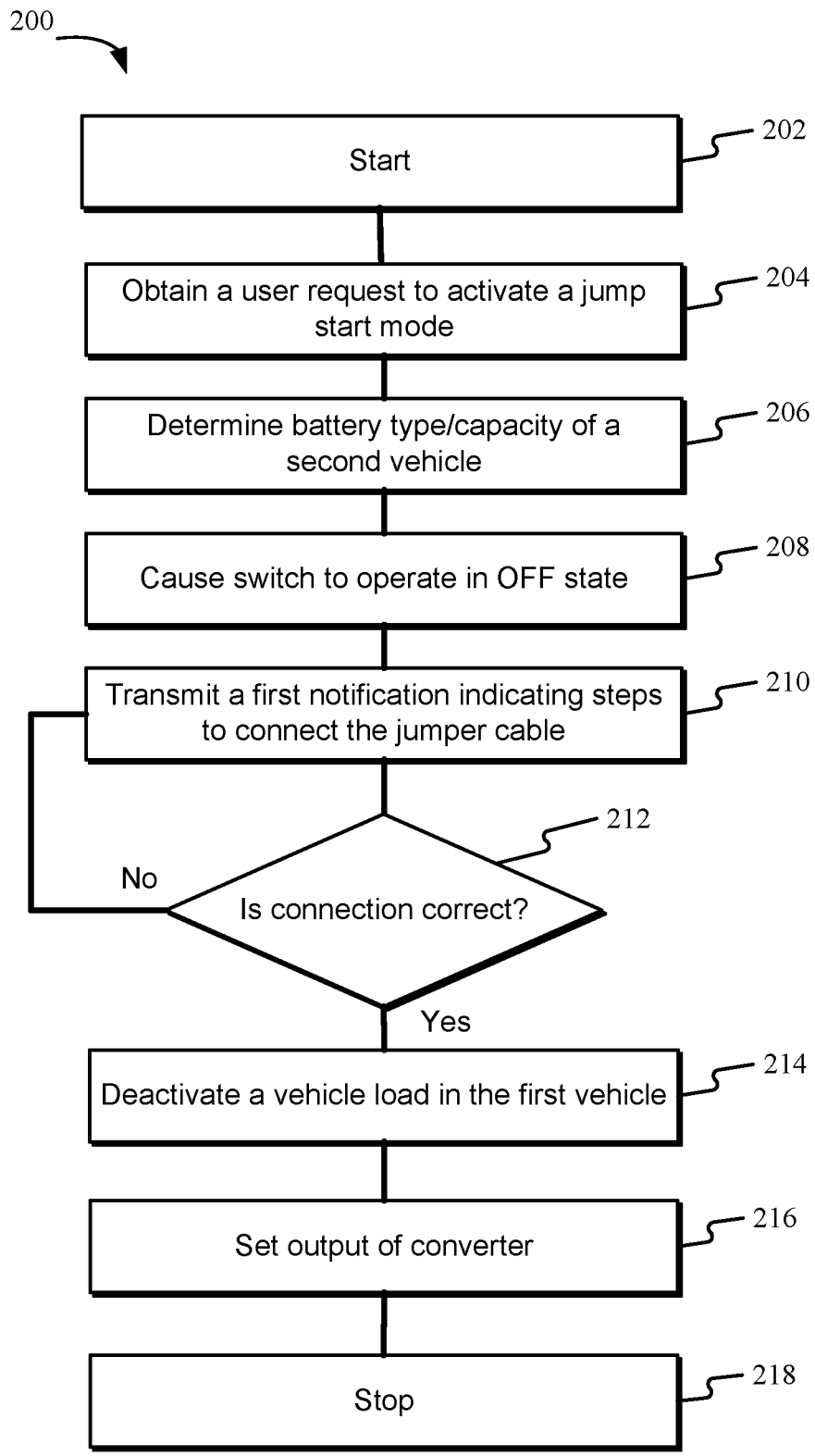
FIG. 2 depicts a flow diagram of a first method for performing jump start in accordance with the present disclosure.

FIG. 2 depicts a flow diagram of an example first method 200 for performing jump start in accordance with the present disclosure. FIG. 2 may be described with continued reference to FIG. 1. The following process is exemplary and not confined to the steps described hereafter. Moreover, alternative embodiments may include more or less steps than are shown or described herein and may include these steps in a different order than the order described in the following example embodiments. While explaining FIG. 2, references will be made to FIG. 4 that depicts an example snapshot of a user interface 400 displaying one or more notifications to assist a vehicle operator to jump start a vehicle.

Referring to FIG. 2, at step 202, the method 200 may commence. At step 204, the method 200 may include obtaining, by the control unit 118, a user request to activate a jump start mode of the first vehicle 100. In the jump start mode, the first vehicle 100 may be configured to jump start the second vehicle 102, when the second vehicle 102 may be temporarily connected to the first vehicle 100. In some aspects, the first vehicle 100 may be temporarily connected to the second vehicle 102 by connecting the battery 104 with the second energy storage system 108 via the jumper cable

406. In some aspects, the control unit 118 may obtain the user request from the user interface 400. The user interface 400 may be associated with a user device (such as a mobile phone, a laptop, a wearable device, a tablet, and/or the like), a Human-Machine Interface (HMI) associated with the first vehicle 100, or a head-up display (HUD) in the first vehicle 100. In further aspects, the control unit 118 may receive the user request from a dedicated actuator or button disposed in the first vehicle 100.

At step 206, the method 200 may include determining, by the control unit 118, a battery type and/or a battery capacity of the battery 104 responsive to obtaining the user request, when the second vehicle 102 may be temporarily connected with the first vehicle 100. The control unit 118 may use information associated with the battery type and/or the battery capacity of the battery 104 to determine charging time needed to charge the battery 104 before cranking an engine associated with the second vehicle 102 (as described later in the description below).

In some aspects, the control unit 118 may determine the battery type and/or the battery capacity by transmitting a request to the user interface 400, requesting the vehicle operator to input the battery type and/or battery capacity of the battery 104. The vehicle operator may view/hear the request on the user interface 400 and may provide/input the required battery details (e.g., the battery type/capacity) on the user interface 400 responsive to viewing/hearing the request. In further aspects, the vehicle operator may provide/input information associated with vehicle type of the second vehicle 102 (e.g., whether the second vehicle 102 is an ICE vehicle, vehicle's model number, etc.). In additional or alternative aspects, the control unit 118 may determine the battery type and/or the battery capacity by obtaining inputs from a vehicle camera (not shown). In this case, the control unit 118 may determine the vehicle type associated with the second vehicle 102, the battery type and/or the battery capacity by analyzing (e.g., by using known image processing algorithms) images captured by the vehicle camera.

At step 208, the method 200 may include causing, by the control unit 118, the switch 114 to operate in the OFF state, responsive to determining the battery type/capacity. At step 210, the method 200 may include transmitting, by the control unit 118, a first notification on the user interface 400 indicating one or more steps required to be performed by the vehicle operator to connect the jumper cable 406 to the battery 104 and the second energy storage system 108 (associated with the first vehicle 100). The control unit 118 may transmit the first notification when the switch 114 may be in the OFF state to prevent any adverse situation. In an exemplary aspect, the first notification may display connection points (or provide visual indications of connection point locations) of the battery 104 and the second energy storage system 108, as depicted in the FIG. 4 (specifically, a view 402 in FIG. 4) to facilitate the vehicle operator to connect the battery 104 and the second energy storage system 108 via the jumper cable 406. In further aspects, the first notification may include one or more textual steps that may facilitate the vehicle operator to connect the battery 104 and the second energy storage system 108 via the jumper cable 406, as shown in a view 404 of FIG. 4.

At step 212, the method 200 may include determining, by the control unit 118, whether the connection of the jumper cable 406 is correct. Stated another way, the control unit 118 may determine whether the jumper cable 406 is correctly attached to the battery 104 and the second energy storage system 108 (i.e., connected as per the steps indicated on the user interface 400). In some aspects, the control unit 118 may obtain inputs (e.g., current and voltage information such as voltage drop) from the detection unit 116 and may verify the jumper cable connection based on the inputs obtained from the detection unit 116.

Responsive to a determination that the jumper cable 406 may not be properly attached, the method 200 may move back to the step 210. In some aspects, the control unit 118 may provide feedback (e.g., via horn chirp or exterior sound exciter) to the vehicle operator when the jumper cable 406 may not be properly attached. On the other hand, responsive to a determination that the jumper cable 406 may be correctly attached, the method 200 may move to step 214. In some aspects, the control unit 118 may further transmit another notification on the user interface 400 to indicate to the vehicle operate that the jumper cable 406 is correctly attached.

At step 214, the method 200 may include deactivating, by the control unit 118, one or more vehicle loads (heated sitting area, steering wheel, etc.) in the first vehicle 100, responsive to determining that the jumper cable 406 is correctly attached. In some aspects, the control unit 118 may deactivate the vehicle load(s) to enable the control unit 118 to provide additional amount of current (via the DC-DC converter 112) to crank the engine associated with the second vehicle 102. For example, the control unit 118 may deactivate the vehicle load(s) such that the current usage by the first vehicle 100 reduces to or below a predefined value (e.g., 80 A-100 A). In some aspects, the control unit 118 may deactivate the vehicle load(s) when the control unit 118 receives the user request to activate the jump start mode (e.g., in order to distinguish from a faulty vehicle condition).

At step 216, the method 200 may include setting, by the control unit 118, an output voltage of the DC-DC converter 112 to a predetermined voltage value. Specifically, the control unit 118 may drop the voltage output from the DC-DC converter 112 (or DC-DC output voltage) to a voltage level/value slightly above a second energy storage system voltage to prevent overcurrent on the switch 114 when the switch 114 may be closed or caused to operate in the ON state. The step of causing the switch 114 to operate in the ON state is described below in conjunction with FIG. 3.

At step 218, the method 200 may stop.

Figure 3:
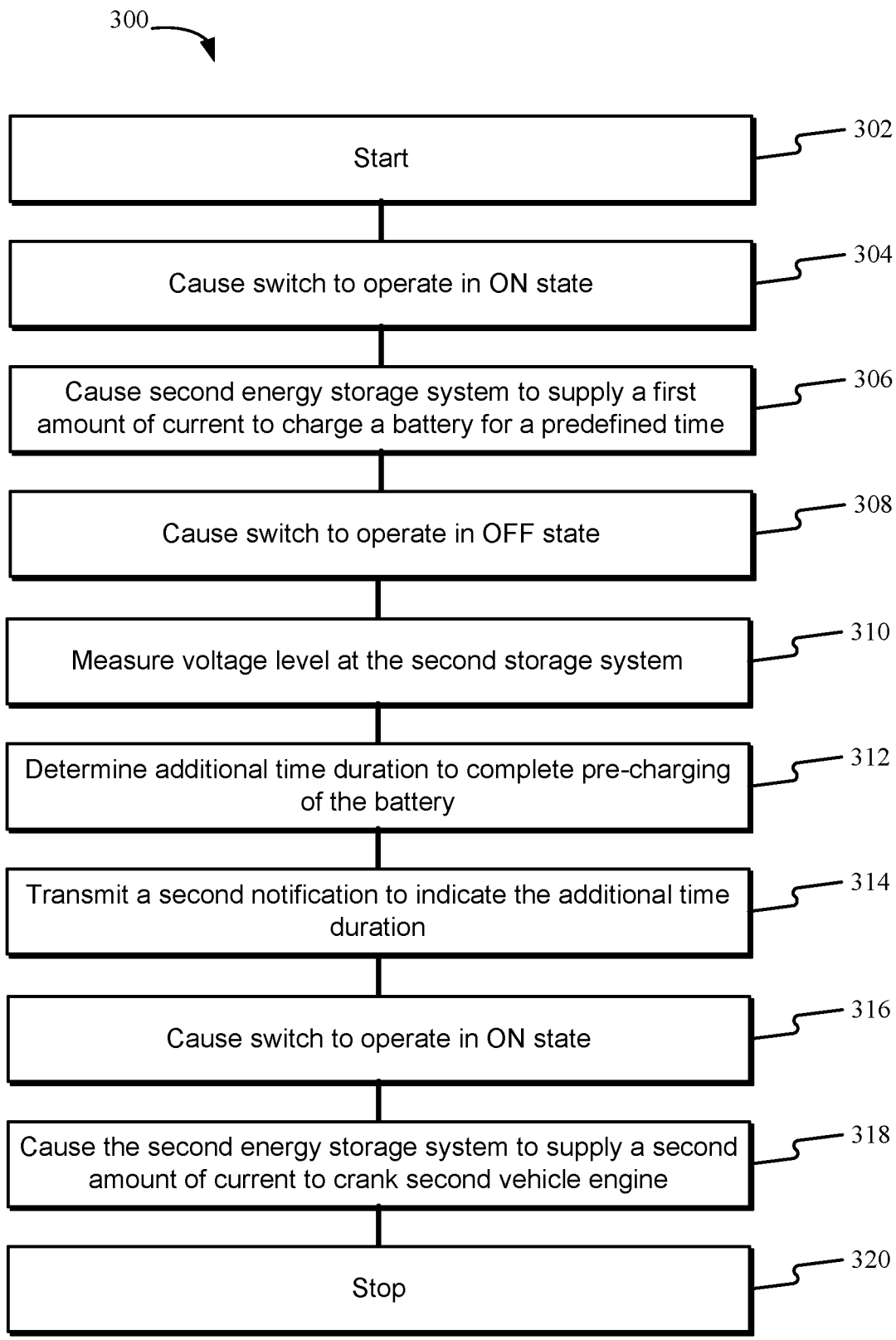
FIG. 3 depicts a flow diagram of a second method for performing jump start in accordance with the present disclosure.

FIG. 3 depicts a flow diagram of an example second method 300 for performing jump start in accordance with the present disclosure. FIG. 3 may be described with continued reference to prior figures. The following process is exemplary and not confined to the steps described hereafter. Moreover, alternative embodiments may include more or less steps than are shown or described herein and may include these steps in a different order than the order described in the following example embodiments.

Referring to FIG. 3, at step 302, the method 300 may commence. At step 304, the method 300 may include causing, by the control unit 118, the switch 114 to operate in the ON state. Stated another way, the control unit 118 may close the switch 114, thereby enabling the current to flow between the DC-DC converter 112 and the second energy storage system 108 (e.g., when the output voltage of the DC-DC converter 112 is set, as described above in conjunction with the step 216).

At step 306, the method 300 may include causing, by the control unit 118, the second energy storage system 108 to supply a first amount of current to pre-charge the battery 104 for a predefined time duration (e.g., in a pre-crank stage that may be before cranking the second vehicle 102). For example, the control unit 118 may cause the second energy storage system 108 to supply the first amount of current to the battery 104 for 2 minutes. In some aspects, the control unit 118 may set the output voltage of the DC-DC converter 112 at the step 216 at such a level that the first amount of current in a range of 100-120 A may flow from the switch 114 in the pre-crank stage. The control unit 118 may cause the second energy storage system 108 to supply the first amount of current when the switch 114 may be in the ON state.

At step 308, the method 300 may include causing, by the control unit 118, the switch 114 to move operation from the ON state to the OFF state when the predefined time duration (e.g., 2 minutes, in the pre-crank stage) may be completed. For example, the control unit 118 may open the switch 114 when the battery 104 may be pre-charged for 2 minutes in the pre-crank stage by using the first amount of current.

At step 310, the method 300 may include measuring, by the control unit 118, a voltage level at the second energy storage system 108 (e.g., when the switch 114 may be at the OFF state). In some aspects, the control unit 118 may obtain inputs from the detection unit 116 when the switch 114 may be at the OFF state and determine the voltage level described above (or battery 104 charging level) based on the inputs obtained from the detection unit 116. As an example, the control unit 118 may determine the voltage drop at the second energy storage system 108 during the predefined time for which the second energy storage system 108 supplied energy to the battery 104.

At step 312, the method 300 may include determining, by the control unit 118, additional time duration that may be required to complete pre-charging of the battery 104. Stated another way, the control unit 118 may determine/calculate an additional time duration needed to pre-charge the battery 104 in the pre-crank stage. In some aspects, the control unit 118 may calculate the additional time duration based on the measured voltage level (or charging level) of the battery 104 (as determined in the step 310), the battery type, and/or the battery capacity. The calculation of the additional time duration based on the real-time measured voltage level (i.e., after charging the battery 104 for the predefined time, as described above) provides an accurate charging state of the battery 104. In some aspects, the calculation of the additional time duration needed by the battery 104 is also based on the total charge needed by the battery 104, which may be based on the battery type/capacity. In further aspects, the calculation of the additional time duration factors—in variations in real-time ambient temperature.

At step 314, the method 300 may include transmitting, by the control unit 118, a second notification to the user interface 400 indicating the additional time duration needed to pre-charge the battery 104. At step 316, the method 300 may include causing, by the control unit 118, the switch 114 to move operation from the OFF state to the ON state, responsive to calculating the additional time duration. Operating the switch 114 in the ON state causes the second energy storage system 108 to supply the first amount of current for the additional time duration to the battery 104. In additional aspects, the control unit 118 may transmit a third notification to the user interface 400 indicating that the battery 104 may be pre-charged when the additional time duration may be completed. In further aspects, the third notification may include a request for the vehicle operator to crank the second vehicle engine when the additional time duration may be completed.

At step 318, the method 300 may include causing, by the control unit 118, the second energy storage system 108 to supply a second amount of current to the battery 104 for another predefined time duration (e.g., 10 seconds) to crank the second vehicle engine (or second vehicle ignition system). The second amount of current may be greater than the first amount of current. In some aspects, the control unit 118 may cause the second energy storage system 108 to supply the second amount of current in the cranking stage (e.g., when the predefined time duration and the additional time duration, described above, may be completed). During cranking stage, the control unit 118 may set the output voltage of the DC-DC converter 112 to such a level that the second amount of current of around 200A may flow from the switch 114. In an exemplary aspect, the control unit 118 may cause the second energy storage system 108 to supply the second amount of current of 200 A for 10 seconds to the battery 104. When the current in the switch 114 exceeds 200A, the switch 114 may be opened (i.e., switched to the OFF state), and the control unit 118 may transmit a feedback to the vehicle operator via the user interface 400. In this case, the switch 114 may not close again (i.e., revert to the ON state) until the switch 114 is cooled.

When the second vehicle engine may be cranked, the second vehicle engine may begin to charge the battery 104, and the jumper cable 406 may be removed. In this manner, the first vehicle 100 may be used to supply power to the second vehicle 102 to start a second vehicle ignition system when the battery 104 associated with the second vehicle 102 may be discharged. The above mentioned steps including the step of pre-charging the battery 104 (before cranking the second vehicle engine) by supplying the first amount of current, step of disabling/deactivating one or more vehicle loads, step of supplying the second amount of current (that is greater than the first amount of current) during cranking of the second vehicle engine facilitates the first vehicle 100 to provide sufficient power to crank the second vehicle engine.

At step 320, the method 300 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and nonlimiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A first vehicle comprising:
   a first energy storage system configured to provide power to an electric motor;
   a second energy storage system configured to provide power to a battery of a second vehicle via a jumper cable;
   a converter configured to receive high-voltage power from the first energy storage system and provide low-voltage power to the second energy storage system;
   a switch configured to selectively connect the second energy storage system and the converter, wherein the switch is configured to operate in an ON state and an OFF state; and
   a control unit configured to:
      obtain a user request to activate a jump start mode of the first vehicle, wherein the first vehicle is configured to jump start the battery in the jump start mode;
      deactivate a vehicle load in the first vehicle after obtaining the user request;
      cause the switch to operate in the ON state after deactivation of the vehicle;
      cause the second energy storage system to supply a first amount of current to pre-charge the battery for a predefined time duration when the switch is in the ON state; and
      cause the second energy storage system to supply a second amount of current to the battery to start a second vehicle ignition system when the battery is pre-charged.

2. The first vehicle of claim 1, wherein the second amount of current is greater than the first amount of current.

3. The first vehicle of claim 1, wherein the control unit is configured to receive the user request to activate the jump start mode via a user interface.

4. The first vehicle of claim 3, wherein the user interface is associated with a user device or a head-up display (HUD).

5. The first vehicle of claim 3, wherein the control unit is configured to:
   cause the switch to move operation from the ON state to the OFF state responsive to obtaining the user request; and
   transmit a first notification to the user interface indicating one or more steps to connect the jumper cable to the battery and the first vehicle when the switch is in the OFF state, wherein the first notification comprises visual indications of locations of connection points associated with the battery and the first vehicle.

6. The first vehicle of claim 1 further comprising a detection unit configured to measure a flow of current and voltage at the second energy storage system.

7. The first vehicle of claim 6, wherein the control unit is further configured to:
   obtain inputs from the detection unit;
   verify a jumper cable connection with the battery and the first vehicle based on the inputs obtained from the detection unit; and
   transmit, based on verifying the jumper cable connection with the battery and the first vehicle, a second notification.

8. The first vehicle of claim 7, wherein the control unit is further configured to:
   cause the switch to move operation from the ON state to the OFF state when the predefined time duration is completed;
   obtain inputs from the detection unit when the switch operates in the OFF state;
   determine a voltage level of the battery based on the inputs obtained from the detection unit;
   calculate an additional time duration needed to pre-charge the battery based on the voltage level of the battery; and
   transmit a third notification indicating the additional time duration needed to pre-charge the battery.

9. The first vehicle of claim 8, wherein the control unit is further configured to:

cause the switch to move operation from the OFF state to the ON state responsive to calculating the additional time duration; and cause the second energy storage system to supply the first amount of current for the additional time duration when the switch is in the ON state.

10. The first vehicle of claim 9, wherein the control unit is further configured to transmit a fourth notification indicating that the battery is pre-charged when the additional time duration is completed.

11. The first vehicle of claim 9, wherein the control unit is further configured to cause the second energy storage system to supply the second amount of current when the additional time duration is completed.

12. The first vehicle of claim 8, wherein the control unit is further configured to:
- determine a battery type and a battery capacity associated with the battery; and
- calculate the additional time duration based on the battery type and the battery capacity.

13. A method comprising:
- obtaining, by a control unit, a user request to activate a jump start mode of a first vehicle, wherein the first vehicle is configured to jump start a battery of a second vehicle, via a jumper cable, in the jump start mode;
- deactivating, by the control unit, a vehicle load in the first vehicle after obtaining the user request;
- causing, by the control unit, a switch to operate in an ON state after the deactivation, wherein:
  - the switch is configured to selectively connect a second energy storage system and a converter,
  - the switch is configured to operate in the ON state and an OFF state,
  - the second energy storage system is configured to provide power to the battery,
  - the converter is configured to (i) receive high-voltage power from a first energy storage system configured to provide power to an electric motor and (ii) provide low-voltage power to the second energy storage system;
- causing, by the control unit, the second energy storage system to supply a first amount of current to pre-charge the battery for a predefined time duration when the switch is in the ON state; and
- causing, by the control unit, the second energy storage system to supply a second amount of current to the battery to start a second vehicle ignition system when the battery is pre-charged.

14. The method of claim 13, wherein the second amount of current is greater than the first amount of current.

15. The method of claim 13, wherein obtaining the user request comprises obtaining the user request to activate the jump start mode via a user interface.

16. The method of claim 15, wherein the user interface is associated with a user device or a head-up display (HUD).

17. The method of claim 15 further comprising:
- causing the switch to move operation from the ON state to the OFF state responsive to obtaining the user request; and
- transmitting a first notification to the user interface indicating one or more steps to connect the jumper cable to the battery and the first vehicle when the switch is in the OFF state, wherein the first notification comprises visual indications of locations of connection points associated with the battery and the first vehicle.

18. The method of claim 13 further comprising:
- causing the switch to move operation from the ON state to the OFF state when the predefined time duration is completed;
- obtaining inputs from a detection unit when the switch operates in the OFF state, wherein the detection unit is configured to measure a flow of current and voltage at the second energy storage system;
- determining a voltage level of the battery based on the inputs obtained from the detection unit;
- calculating an additional time duration needed to pre-charge the battery based on the voltage level of the battery; and
- transmitting a third notification indicating the additional time duration needed to pre-charge the battery.

19. The method of claim 18, wherein causing the second energy storage system to supply the second amount of current comprises causing the second energy storage system to supply the second amount of current when the additional time duration is completed.

20. A non-transitory computer-readable medium storing computer-executable instructions which when executed by one or more processors result in performing operations comprising:
- obtaining a user request to activate a jump start mode of a first vehicle, wherein the first vehicle is configured to jump start a battery, of a second vehicle via a jumper cable, in the jump start mode;
- deactivating a vehicle load in the first vehicle after obtaining the user request;
- causing a switch to operate in an ON state after the deactivation, wherein:
  - the switch is configured to selectively connect a second energy storage system and a converter,
  - the switch is configured to operate in the ON state and an OFF state,
  - the second energy storage system is configured to provide power to the battery,
  - the converter is configured to (i) receive high-voltage power from a first energy storage system configured to provide power to an electric motor and (ii) provide low-voltage power to the second energy storage system;
- causing the second energy storage system to supply a first amount of current to pre-charge the battery for a predefined time duration when the switch is in the ON state; and
- causing the second energy storage system to supply a second amount of current to the battery to start a second vehicle ignition system when the battery is pre-charged.

* * * * *